United States Patent
Sato et al.

(10) Patent No.: US 10,854,917 B2
(45) Date of Patent: Dec. 1, 2020

(54) ALL SOLID-STATE LITHIUM ION SECONDARY BATTERY

(71) Applicant: TDK CORPORATION, Tokyo (JP)

(72) Inventors: Hiroshi Sato, Tokyo (JP); Masahiro Oishi, Tokyo (JP); Takeo Tsukada, Tokyo (JP); Gakuho Isomichi, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 76 days.

(21) Appl. No.: 16/333,384

(22) PCT Filed: Sep. 25, 2017

(86) PCT No.: PCT/JP2017/034487
§ 371 (c)(1),
(2) Date: Mar. 14, 2019

(87) PCT Pub. No.: WO2018/062085
PCT Pub. Date: Apr. 5, 2018

(65) Prior Publication Data
US 2019/0252720 A1    Aug. 15, 2019

(30) Foreign Application Priority Data
Sep. 29, 2016    (JP) .................... 2016-192078

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/136* (2013.01); *H01M 4/58* (2013.01);
(Continued)

(58) Field of Classification Search
None
See application file for complete search history.

(56) References Cited

U.S. PATENT DOCUMENTS

2007/0202400 A1    8/2007    Yoshida et al.
2010/0216032 A1    8/2010    Baba et al.
(Continued)

FOREIGN PATENT DOCUMENTS

| JP | 2007-258165 A | 10/2007 |
| JP | 2016-001595 A | 1/2016 |
| WO | 2008/143027 A1 | 11/2008 |

OTHER PUBLICATIONS

Oct. 31, 2017 International Search Report issued in International Patent Application No. PCT/JP2017/034487.

*Primary Examiner* — Scott J. Chmielecki
(74) *Attorney, Agent, or Firm* — Oliff PLC

(57) ABSTRACT

An active material layer containing a compound represented by a general formula (1): $Li_aV_bAl_cTi_dP_eO_{12}$ (1), where a, b, c, d, and e in the general formula (1) are numbers satisfying $0.5 \le a \le 3.0$, $1.20 < b \le 2.00$, $0.01 \le c < 0.06$, $0.01 \le d < 0.60$, and $2.80 \le e \le 3.20$; and a solid electrolyte layer containing a compound represented by a general formula (2): $Li_fV_gAl_hTi_iP_jO_{12}$ (2), where f, g, h, i, and j in general formula (2) are numbers satisfying $0.5 \le f \le 3.0$, $0.01 \le g < 1.00$, $0.09 < h \le 0.30$, $1.40 < i \le 2.00$, and $2.80 \le j \le 3.20$.

15 Claims, 1 Drawing Sheet

(51) Int. Cl.
- *H01M 10/058* (2010.01)
- *H01M 4/58* (2010.01)
- *H01M 10/052* (2010.01)
- *H01M 4/136* (2010.01)
- *H01B 1/06* (2006.01)

(52) U.S. Cl.
CPC ....... *H01M 10/052* (2013.01); *H01M 10/058* (2013.01); *H01M 10/0525* (2013.01); *H01B 1/06* (2013.01); *H01M 2300/0071* (2013.01)

(56) References Cited

U.S. PATENT DOCUMENTS

| | | | |
|---|---|---|---|
| 2015/0333366 A1 | 11/2015 | Sato et al. | |
| 2019/0207254 A1* | 7/2019 | Sato | H01M 4/58 |
| 2019/0252720 A1* | 8/2019 | Sato | H01M 10/058 |
| 2019/0280327 A1* | 9/2019 | Sato | H01M 10/052 |
| 2019/0305306 A1* | 10/2019 | Sato | H01M 4/366 |
| 2020/0014070 A1* | 1/2020 | Oishi | H01M 10/0525 |
| 2020/0028215 A1* | 1/2020 | Sato | H01M 4/661 |
| 2020/0067133 A1* | 2/2020 | Sato | H01M 4/136 |

\* cited by examiner

ALL SOLID-STATE LITHIUM ION SECONDARY BATTERY

TECHNICAL FIELD

The present invention relates to an all solid-state lithium ion secondary battery.

Priority is claimed on Japanese Patent Application No. 2016-192078, filed Sep. 29, 2016, the content of which is incorporated herein by reference.

BACKGROUND ART

Lithium ion secondary batteries are widely used as power sources for small portable devices such as mobile phones, notebook PCs, or PDAs. Lithium ion secondary batteries used in such small portable devices are required to be made smaller, thinner, and more reliable.

As lithium ion secondary batteries, a battery in which an organic electrolytic solution is used as an electrolyte, and a battery in which a solid electrolyte is used as an electrolyte are known. A lithium ion secondary battery in which a solid electrolyte is used as an electrolyte (all solid-state lithium ion secondary battery) is advantageous in that a battery size is easily reduced and thinned because a degree of freedom in designing a battery shape is high, and reliability is high because leakage or the like of an electrolytic solution does not occur, as compared with a lithium ion secondary battery in which an organic electrolytic solution is used.

On the other hand, all solid-state lithium ion secondary batteries generally have lower lithium ion conductivity than organic electrolytic solutions. For this reason, all solid-state lithium ion secondary batteries have a problem that an internal resistance is high and an output current is low, as compared with lithium ion secondary batteries in which an organic electrolytic solution is used. Accordingly, all solid-state lithium ion secondary batteries are required to have higher ionic conductivity of lithium ions and a lower internal resistance.

Patent Literature 1 discloses that a polyanion compound is used for each of a positive electrode active material, a negative electrode active material, and a solid electrolyte of an all solid-state lithium ion secondary battery; and that a common element group (X), which serves as a polyanion constituting each of the positive electrode active material, the negative electrode active material, and the solid electrolyte, is used. According to Patent Literature 1, ionic conductivity between positive electrodes, negative electrodes, and solid electrolyte layers is improved by using a common element group (X) serving as a polyanion, and therefore characteristics such as high current extraction and a charge and discharge cycle are improved.

Meanwhile, Patent Literature 2 discloses that an all solid-state lithium ion secondary battery in which an interlayer made of a substance functioning as an active material or an electrolyte is formed at the interface between a positive electrode layer and/or a negative electrode layer and an electrolyte layer. Patent Literature 2 discloses that the interlayer is formed by reaction between and/or diffusion of the positive electrode active material and/or the negative electrode active material and the solid electrolyte; and that, for example, an interlayer containing $LiMnO_2$, $Li_2MnO_3$, and $Li_{1.4}Mn_{1.7}O_4$ is formed by using $LiMn_2O_4$ as the positive electrode active material, and $Li_{3.5}Si_{0.5}P_{0.5}O_4$ as the solid electrolyte.

CITATION LIST

Patent Literature

[Patent Literature 1]
  Japanese Unexamined Patent Application, First Publication No. 2007-258165 (A)
[Patent Literature 2]
  PCT International Publication No. WO2008/143027 (A)

SUMMARY OF INVENTION

Technical Problem

All solid-state lithium ion secondary batteries are required to have a lower internal resistance. However, in the all solid-state lithium ion secondary batteries disclosed in Patent Literatures 1 and 2, it is difficult to further reduce an internal resistance.

In the all solid-state lithium ion secondary battery disclosed in Patent Literature 1, a polyanion compound is used for each of the positive electrode active material, the negative electrode active material, and the solid electrolyte, but metal components contained in a polyanion compound as the positive electrode active material and the negative electrode active material, and the solid electrolyte are different. For this reason, it is difficult to improve lithium ion conductivity between the positive electrode active material and the solid electrolyte and between the negative electrode active material and the solid electrolyte, and therefore it has been difficult to reduce an internal resistance.

In addition, in the all solid-state lithium ion secondary battery disclosed in Patent Literature 2, since the compositions of the interlayer and the solid electrolyte layer are different, it is difficult to improve lithium ion conductivity between the interlayer and the solid electrolyte layer, and therefore it has been difficult to reduce an internal resistance.

The present invention has been made in view of the above problems, and an object thereof is to provide a solid lithium ion secondary battery with a reduced internal resistance.

Solution to Problem

The inventors of the present invention have found that, in a Li—V—Al—Ti—P—O compound containing lithium (Li), vanadium (V), aluminum (Al), titanium (Ti), phosphorus (P), and oxygen (O), charge and discharge capacity of lithium ions is improved when a content ratio of V is high, and lithium ion conductivity is improved when a content ratio of Al and Ti is high. In addition, the inventors of the present invention have perceived that an all solid-state lithium ion secondary battery with a reduced internal resistance can be obtained by using a Li—V—Al—Ti—P—O compound in which a content ratio of V is high as an electrode active material, and using a Li—V—Al—Ti—P—O compound in which a content ratio of Al and Ti is high as a solid electrolyte. The reason why an internal resistance of the all solid-state lithium ion secondary battery is reduced is considered to be because using the same constituent elements for the electrode active material and the solid electrolyte improved lithium ion conductivity between the electrode active material layer and the solid electrolyte layer.

In other words, the present invention provides the following means to solve the above problem.

An all-solid lithium ion secondary battery according to one aspect of the present invention includes a pair of electrode layers, and a solid electrolyte layer provided between the pair of electrode layers, in which at least one electrode layer of the pair of electrode layers has an active material layer containing a compound represented by a general formula (1), and the solid electrolyte layer contains a compound represented by a general formula (2).

$$Li_aV_bAl_cTi_dP_eO_{12} \qquad (1),$$

where a, b, c, d, and e in the general formula (1) are numbers satisfying 0.5≤a≤3.0, 1.20<b≤2.00, 0.01≤c<0.06, 0.01≤d<0.60, and 2.80≤e≤3.20.

$$Li_fV_gAl_hTi_iP_jO_{12} \qquad (2),$$

where f, g, h, i, and j in the general formula (2) are numbers satisfying 0.5≤f≤3.0, 0.01≤g<1.00, 0.09<h≤0.30, 1.40<i≤2.00, and 2.80≤j≤3.20.

In the all solid-state lithium ion secondary battery according to the above-described aspect, a, b, c, d, and e in the general formula (1) may be numbers satisfying 0.8≤a≤3.0, 1.20<b≤2.00, 0.01≤c<0.06, 0.01≤d<0.60, and 2.90≤e≤3.10.

In the all solid-state lithium ion secondary battery according to the above-described aspect, f, g, h, i, and j in the general formula (2) may be numbers satisfying 0.8≤f≤3.0, 0.01≤g<1.00, 0.09<h≤0.30, 1.40<i≤2.00, and 2.90≤j≤3.10.

In the all solid-state lithium ion secondary battery according to the above-described aspect, the electrode layer having the active material layer containing the compound represented by the general formula (1) among the pair of electrode layers may have an interlayer on a surface on a side of the solid electrolyte layer, the electrode layer having the active material layer containing the compound represented by the general formula (1) among the pair of electrode layers may have an interlayer on a surface on a side of the solid electrolyte layer, and the interlayer may contain a compound represented by the general formula (3).

$$Li_kV_mAl_nTi_qP_rO_{12} \qquad (3),$$

where k, m, n, q, and r in the general formula (3) are numbers satisfying 0.5≤k≤3.0, 1.00≤m≤1.20, 0.06≤n≤0.09, 0.60≤q≤1.40, and 2.80≤r≤3.20.

In the all solid-state lithium ion secondary battery according to the above-described aspect, both electrode layers of the pair of electrode layers may have the active material layer containing the compound represented by the general formula (1).

In the all solid-state lithium ion secondary battery according to the above-described aspect, a relative density of the pair of electrode layers and the solid electrolyte layer provided between the pair of electrode layers may be 80% or more.

Advantageous Effects of Invention

According to the all solid-state lithium ion secondary battery according to one aspect of the present invention, an internal resistance is reduced.

DESCRIPTION OF EMBODIMENTS

Figure 1:
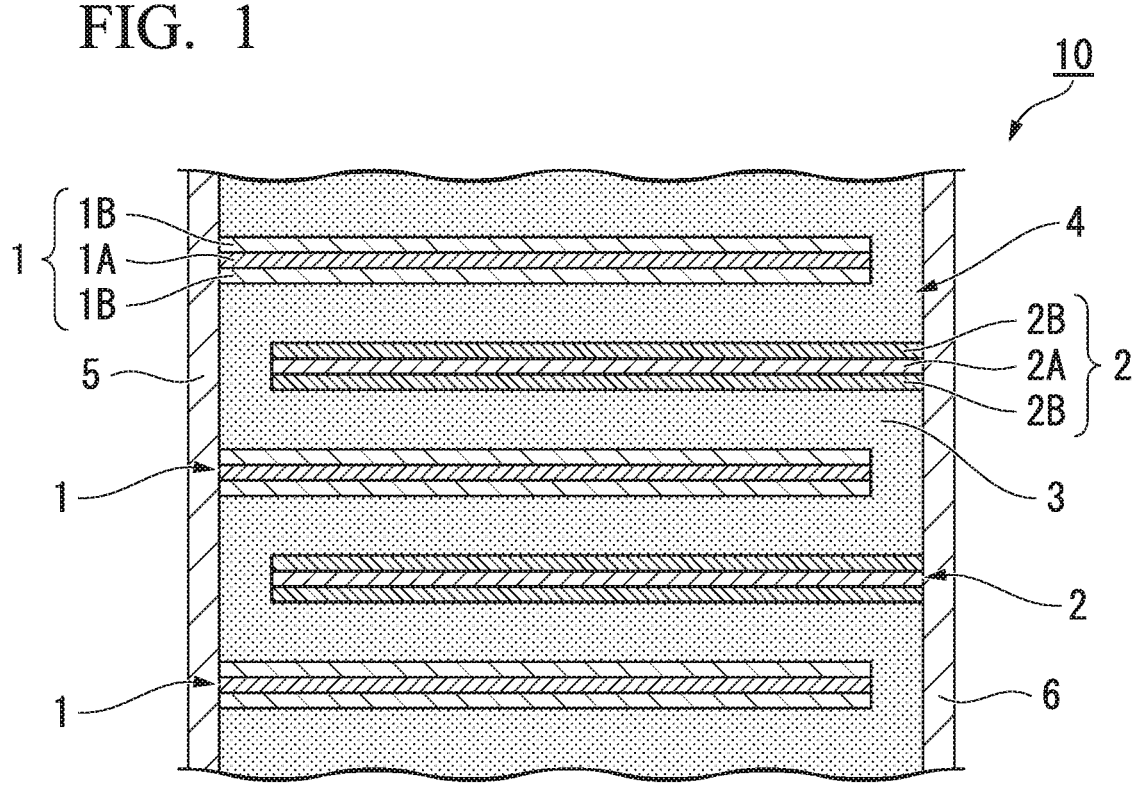
FIG. 1 is a cross-sectional schematic view showing an enlarged main part of an all solid-state lithium ion secondary battery according to a first embodiment of the present invention.

Hereinafter, the present embodiment will be described in detail with reference to the drawings as appropriate. In the drawings used in the following description, a main part is shown in an enlarged manner in some cases for the sake of convenience in order to make the features of the present embodiment easy to understand, and dimensional ratios and the like of the components may be different from actual ratios. The materials, dimensions, and the like exemplified in the following description are merely examples, and the present embodiment is not limited thereto, and can be appropriately changed and modified to carry out the present embodiment, within a range not changing the gist thereof.

First Embodiment

FIG. 1 is a cross-sectional schematic view showing an enlarged main part of an all solid-state lithium ion secondary battery according to a first embodiment. As shown in FIG. 1, an all solid-state lithium ion secondary battery 10 includes a laminate 4 having first electrode layers 1, second electrode layers 2, and a solid electrolyte layer 3. A first electrode layer 1 and a second electrode layer 2 form a pair of electrodes.

Each of the first electrode layers 1 is connected to a first external terminal 5, and each of the second electrode layers 2 is connected to a second external terminal 6. The first external terminal 5 and the second external terminal 6 are electrical contact points with the outside.

(Laminate)

The laminate 4 has the first electrode layers 1, the second electrode layers 2, and the solid electrolyte layer 3. One of the first electrode layer 1 or the second electrode layer 2 functions as a positive electrode layer, and the other functions as a negative electrode layer. The polarity of the electrode layer changes depending on which polarity is connected to the external terminal. Hereinafter, in order to facilitate understanding, the first electrode layer 1 will be referred to as the positive electrode layer 1, and the second electrode layer 2 will be referred to as the negative electrode layer 2.

In the laminate 4, the positive electrode layer 1 and the negative electrode layer 2 are alternately laminated via the solid electrolyte layer 3. The all solid-state lithium ion secondary battery 10 is charged and discharged by exchanging lithium ions between the positive electrode layer 1 and the negative electrode layer 2 via the solid electrolyte layer 3.

(Positive Electrode Layer and Negative Electrode Layer)

The positive electrode layer 1 has a positive electrode current collector layer 1A, and a positive electrode active material layer 1B containing a positive electrode active material. The negative electrode layer 2 has a negative electrode current collector layer 2A, and a negative electrode active material layer 2B containing a negative electrode active material.

(Current Collector Layer)

It is preferable that the positive electrode current collector layer 1A and the negative electrode current collector layer 2A have high electrical conductivity. For this reason, it is preferable that the positive electrode current collector layer 1A and the negative electrode current collector layer 2A contain a low resistance metal such as silver, palladium, gold, platinum, aluminum, copper, or nickel. Among these low resistance metals, copper hardly reacts with a positive electrode active material, a negative electrode active material, and a solid electrolyte. Accordingly, when the positive electrode current collector layer 1A and negative electrode current collector layer 2A which contain copper are used, it is possible to reduce an internal resistance of the all solid-state lithium ion secondary battery 10 over a long period of time. Compositions of the positive electrode current collector layer 1A and the negative electrode current collector layer 2A may be the same as or different from each other.

The positive electrode current collector layer 1A and the negative electrode current collector layer 2A may contain a positive electrode active material and a negative electrode active material which will be described later, respectively. A content ratio of active materials contained in each current collector layer is not particularly limited as long as a layer functions as a current collector. For example, it is preferable that a volume ratio of the low resistance metal/positive electrode active material, or the low resistance metal/negative electrode active material be within a range of 90/10 to 70/30. With the positive electrode current collector layer 1A and the negative electrode current collector layer 2A respectively containing the positive electrode active material and the negative electrode active material, adhesiveness between the positive electrode current collector layer 1A and the positive electrode active material layer 1B, and between the negative electrode current collector layer 2A and the negative electrode active material layer 2B is improved.

(Active Material Layer)

The positive electrode active material layer 1B is formed on one surface or both surfaces of the positive electrode current collector layer 1A. For example, there is no negative electrode layer 2 facing a positive electrode layer 1 which is located at the uppermost layer in a lamination direction of the all solid-state lithium ion secondary battery 10. Accordingly, in the positive electrode layer 1 located at the uppermost layer of the all solid-state lithium ion secondary battery 10, the positive electrode active material layer 1B may be provided only on one side which is a lower side in the lamination direction. The same applies to the negative electrode active material layer 2B as the positive electrode active material layer 1B and is formed on one or both surfaces of the negative electrode current collector layer 2A. Thicknesses of the positive electrode active material layer 1B and the negative electrode active material layer 2B are preferably within a range of 0.5 µm to 5.0 µm. By setting the thicknesses of the positive electrode active material layer 1B and the negative electrode active material layer 2B to 0.5 µm or more, it is possible to increase an electric capacity of the all solid-state lithium ion secondary battery. On the other hand, by setting the thicknesses thereof to 0.5 µm or less, a diffusion distance of lithium ions is shortened, and therefore it is possible to further reduce an internal resistance of the all solid-state lithium ion secondary battery.

Each of the positive electrode active material layer 1B and the negative electrode active material layer 2B contains a positive electrode active material or a negative electrode active material which exchanges electrons with lithium ions. In addition, a conductive auxiliary agent or the like may be contained therein. It is preferable that lithium ions be efficiently inserted and desorbed from the positive electrode active material and negative electrode active material.

In the present embodiment, at least one of the positive electrode active material layer 1B and the negative electrode active material layer 2B contains a compound represented by the general formula (1) as an active material.

$$\text{Li}_a\text{V}_b\text{Al}_c\text{Ti}_d\text{P}_e\text{O}_{12} \tag{1}$$

Here, a, b, c, d, and e in the general formula (1) are numbers satisfying $0.5 \leq a \leq 3.0$, $1.20 < b \leq 2.00$, $0.01 \leq c < 0.06$, $0.01 \leq d < 0.60$, and $2.80 \leq e \leq 3.20$. It is particularly preferable that a, b, c, d, and e be numbers satisfying $0.8 \leq a \leq 3.0$, $1.20 < b \leq 2.00$, $0.01 \leq c < 0.06$, $0.01 \leq d < 0.60$, and $2.90 \leq e \leq 3.10$.

In the compound represented by the general formula (1), Li is occluded or released as ions. When a content of Li is too small, an electric capacity may be reduced. On the other hand, when a content of Li is too large, chemical stability of the compound may be lowered, and reliability of the battery may decrease. Therefore, in the present embodiment, a content of Li is set to be a number satisfying $0.5 \leq a \leq 3.0$, preferably a number satisfying $0.8 \leq a \leq 3.0$, as a of The general formula (1).

V acts to improve electron conductivity. Because the compound of The general formula (1) has high electron conductivity, lithium ions can be occluded or released, and therefore the compound can be used as an active material. When a content of V is too small, electron conductivity cannot be sufficiently improved, and an electric capacity of the battery may decrease. On the other hand, when a content of V is too large, lithium ion conductivity decreases, and an output current of the battery may decrease. Accordingly, in the present embodiment, a content of V is set to be a number satisfying $1.20 < b \leq 2.00$, as b of The general formula (1).

Al and Ti act to improve lithium ion conductivity. When contents of Al and Ti are too small, lithium ion conductivity cannot be sufficiently improved, and a current of the battery may be lowered. In addition, when contents of Al and Ti are too small, a composition difference from the solid electrolyte to be described later becomes large, lithium ion conductivity between the electrode active material layer and the solid electrolyte layer decreases, and therefore an internal resistance of the battery may become high. On the other hand, when contents of Al and Ti are too large, electron conductivity decreases, and a capacity of the battery may decrease. Accordingly, in the present embodiment, a content of Al is set to be a number satisfying $0.01 \leq c < 0.06$ as c of The general formula (1), and a content of Ti is set to be a number satisfying $0.01 \leq d < 0.60$ as d of The general formula (1).

P and O preferably form phosphate ions, and particularly preferably form polyphosphate ions. When a content of P is too small or too large, chemical stability of the compound is lowered, and reliability of the battery may decrease. Accordingly, in the present embodiment, a content of P is set to be a number satisfying $2.80 \leq e \leq 3.20$, preferably a number satisfying $2.90 \leq e \leq 3.10$, as e of The general formula (1).

A compositional ratio of the compound represented by the general formula (1) can be measured, for example, as follows. Contents of Li, V, Al, Ti, and P in the compound are quantitatively determined using a laser ablation ICP mass spectrometry (LA-ICP-MS) method. Next, an atomic ratio of Li, V, Al, Ti, P, and O is calculated with a residue being O. Then, the number of atoms of each of Li, V, Al, Ti, and P when the number of O atoms is 12 is obtained.

The compound represented by the general formula (1) preferably has the same crystal phase as lithium vanadium phosphate [Li$_3$V$_2$(PO$_4$)$_3$] in the monoclinic or trigonal phase, and particularly preferably has the same crystal phase as lithium vanadium phosphate [Li$_3$V$_2$(PO$_4$)$_3$] in the monoclinic phase. However, in the compound represented by the general formula (1), a content ratio of Li, V, Al, Ti, and P is not necessarily a stoichiometric ratio.

Both of the positive electrode active material layer 1B and the negative electrode active material layer 2B may contain an active material represented by the general formula (1), or one of them may contain an active material represented by the general formula (1), and the other may contain an active material other than the active material represented by the general formula (1).

As an active material other than the active material represented by the general formula (1), it is possible to use transition metal oxides, complex transition metal oxides, or the like.

Examples of transition metal oxides and complex transition metal oxides include a complex lithium manganese oxide $Li_2Mn_aMa_{1-a}O_3$ (0.8≤a≤1, Ma=Co, Ni), a lithium cobalt oxide ($LiCoO_2$), a lithium nickel oxide ($LiNiO_2$), a lithium manganese spinel ($LiMn_2O_4$), a complex metal oxide represented by the general formula: $LiNi_xCo_yMn_zO_2$ (x+y+z=1, 0≤x≤1, 0≤y≤1, 0≤z≤1), a lithium vanadium compound ($LiV_2O_5$), olivine-type $LiMbPO_4$ (where Mb is one or more kinds of elements selected from Co, Ni, Mn, Fe, Mg, Nb, Ti, Al, and Zr), lithium vanadium phosphate ($Li_3V_2(PO_4)_3$ or $LiVOPO_4$), a Li-rich solid-solution positive electrode represented by $Li_2MnO_3$-$LiMcO_2$ (Mc=Mn, Co, Ni), lithium titanate ($Li_4Ti_5O_{12}$), a complex metal oxide represented by $Li_sNi_tCo_uAl_vO_2$ (0.9<s<1.3, 0.9<t+u+v<1.1), and the like.

A combination of the positive electrode active material layer 1B and the negative electrode active material layer 2B is preferably a combination in which both layers contain the active material represented by the general formula (1), or a combination in which the positive electrode active material layer 1B contains the active material represented by the general formula (1), and the negative electrode active material layer 2B contains lithium titanate, and particularly preferably a combination in which both layers contain the active material represented by the general formula (1). In a case where both the positive electrode active material layer 1B and the negative electrode active material layer 2B contain the active material represented by the general formula (1), as long as the numbers a, b, c, d, and e of the active material of the positive electrode active material layer 1B and the active material of the negative electrode active material layer 2B satisfy the above-described relationships, the numbers may not be the same.

(Solid Electrolyte Layer)

The solid electrolyte layer 3 is provided between the positive electrode layer 1 and the negative electrode layer 2. A thickness of the solid electrolyte layer 3 is preferably within a range of 0.5 m to 20.0 μm. By setting a thickness of the solid electrolyte layer 3 to 0.5 μm or more, it is possible to reliably prevent a short circuit between the positive electrode layer 1 and the negative electrode layer 2. In addition, by setting a thicknesses thereof to 20.0 pin or less, a migration distance of lithium ions is shortened, and therefore it is possible to further reduce an internal resistance of the all solid-state lithium ion secondary battery. The solid electrolyte layer 3 contains a compound represented by the general formula (2) as a solid electrolyte. The compound represented by the general formula (2) contains larger contents of Al and Ti than the aforementioned active material represented by the general formula (1), and therefore has a high lithium ion conductivity. In addition, in regard to the active material represented by the general formula (1) and the solid electrolyte represented by the general formula (2), because the electrode active material and the fixed electrolyte consist of the same elements (Li, V, Al, Ti, P, O), the lithium ion conductivity between the electrode active material and the solid electrolyte is improved. Accordingly, an internal resistance of the all solid-state lithium ion secondary battery 10 can be reduced.

$$Li_fV_gAl_hTi_iP_jO_{12} \qquad (2)$$

Here, f, g, h, i, and j in the general formula (2) are numbers satisfying 0.5≤f≤3.0, 0.01≤g<1.00, 0.09<h≤0.30, 1.40<i≤2.00, and 2.80≤j≤3.20. It is particularly preferable that f, g, h, i, and j be numbers satisfying 0.8≤f≤3.0, 0.01≤g<1.00, 0.09<h≤0.30, 1.40<i≤2.00, 2.90≤j≤3.10.

In the compound represented by the general formula (2), when a content of Li is too small, lithium ion conductivity may decrease. On the other hand, when a content of Li is too large, chemical stability of the compound may be lowered, and reliability of the battery may decrease. Therefore, in the present embodiment, a content of Li is set to be a number satisfying 0.5≤f≤3.0, preferably a number satisfying 0.8≤f≤3.0, as f of The general formula (2).

V acts to firmly bond the electrode active material layer and the solid electrolyte by enhancing the consistency of the composition with the compound (active material) represented by the general formula (1). When a content of V is too small, a composition difference between the active material and the solid electrolyte becomes large, making it difficult to firmly bond the electrode active material layer and the solid electrolyte, and lithium ion conductivity between the electrode active material layer and the solid electrolyte layer decreases, and therefore an internal resistance of the battery may become high. On the other hand, when a content of V is too large, the solid electrolyte layer becomes electrically conductive, and therefore an internal short circuit may occur when a battery is made. Accordingly, in the present embodiment, a content of V is set to be a number satisfying 0.01≤g<1.00 as g of The general formula (2).

Al and Ti act to improve lithium ion conductivity. When contents of Al and Ti are too small, lithium ion conductivity cannot be sufficiently improved, and an output current of the battery may be lowered. On the other hand, when contents of Al and Ti are too large, a composition difference between the aforementioned active material and the solid electrolyte becomes large, making it difficult to firmly bond the electrode active material layer and the solid electrolyte, and lithium ion conductivity between the electrode active material layer and the solid electrolyte layer decreases, and therefore an internal resistance of the battery may become high. Accordingly, in the present embodiment, a content of Al is set to be a number satisfying 0.09<h≤0.30 as h of The general formula (2), and a content of Ti is set to be a number satisfying 1.40<i≤2.00 as i of The general formula (2).

P and O preferably form phosphate ions, and particularly preferably form polyphosphate ions. When a content of P is too small or too large, chemical stability of the compound is lowered, and reliability of the battery may decrease. Accordingly, in the present embodiment, a content of P is set to be a number satisfying 2.80≤j≤3.20, preferably a number satisfying 2.90 j≤3.10, as j of The general formula (2).

A compositional ratio of the compound represented by the general formula (2) can be obtained in the same manner as in the case of the compound of The general formula (1).

In regard to a crystal structure, the compound represented by the general formula (2) preferably has a NASICON-type crystal structure, and particularly preferably has lithium aluminum titanium phosphate [LifAlgTihPiO12 (f, g, h, and i are numbers satisfying 0.5≤f≤3.0, 0.09≤g≤0.50, 1.40≤h≤2.00, and 2.80≤i≤3.20)]. However, in the compound represented by the general formula (2), a content ratio of Li, V, Al, Ti, and P is not necessarily a stoichiometric ratio of a NASICON-type crystal structure.

(External Terminal)

It is preferable to use a material having high conductivity for the first external terminal 5 and the second external terminal 6 of the all solid-state lithium ion secondary battery 10. For example, silver, gold, platinum, aluminum, copper, tin, and nickel can be used. The first external terminal 5 and the second external terminal 6 may be configured of the same material or may be configured of different materials. The external terminal may have a single layer or a plurality of layers.

(Protective Layer)

In addition, the all solid-state lithium ion secondary battery 10 may have a protective layer on an outer periphery of the laminate 4 for protecting the laminate 4 and terminals electrically, physically, and chemically. It is preferable that a material constituting the protective layer have excellent insulation, durability, and moisture resistance, and be environmentally safe. For example, it is preferable to use glass, ceramics, thermosetting resins, or photocurable resins. One kind or a plurality of kinds may be used in combination as a material of the protective layer. In addition, the protective layer may be a single layer, but is preferably a plurality of layers. Among them, an organic-inorganic hybrid in which a thermosetting resin and a ceramic powder are mixed is particularly preferable.

(Method for Manufacturing all Solid-State Lithium Ion Secondary Battery)

A method for manufacturing the all solid-state lithium ion secondary battery 10 may use a simultaneous calcination method or may use a sequential calcination method.

The simultaneous calcination method is a method in which materials forming each layer are laminated to produce the laminate 4 by batch calcination. The sequential calcination method is a method for producing each layer in order, and includes a calcinating step for every layer production. Using the simultaneous calcination method can reduce the number of processing steps of the all solid-state lithium ion secondary battery 10. In addition, using the simultaneous calcination method makes the obtained laminate 4 dense. Hereinafter, a case of using the simultaneous calcination method will be described as an example.

The simultaneous calcination method includes a step of creating a paste of a material for forming each layer constituting the laminate 4, a step of coating and drying the paste to produce a green sheet, and a step of laminating the green sheet and simultaneously calcinating the produced laminate sheet.

First, materials for forming each layer of the positive electrode current collector layer 1A, the positive electrode active material layer 1B, the solid electrolyte layer 3, the negative electrode active material layer 2B, and the negative electrode current collector layer 2A, which constitute the laminate 4, are made into a paste.

A method for making a paste is not particularly limited. For example, powders of each material are mixed into a vehicle to obtain a paste. A vehicle is a generic name of a medium in a liquid phase. Vehicles generally include solvents, dispersants, and binders. According to such a method, a paste for the positive electrode current collector layer 1A, a paste for the positive electrode active material layer 1B, a paste for the solid electrolyte layer 3, a paste for the negative electrode active material layer 2B, and a paste for the negative electrode current collector layer 2A are produced.

Next, a green sheet is produced. The green sheet is obtained by applying the produced paste onto a substrate such as polyethylene terephthalate (PET) in a desired order, drying if necessary, and peeling off the substrate. A method for applying a paste is not particularly limited. For example, known methods such as screen printing, coating, transfer, or doctor blade can be adopted.

Each green sheet produced is piled up in a desired order and number of laminates. Alignment, cutting, and the like are performed if necessary to produce a green sheet laminate. In a case of producing a parallel-type or series-parallel-type battery, it is preferable to perform alignment to pile up sheets so that an end surface of the positive electrode layer and an end surface of the negative electrode layer does not correspond to each other.

The green sheet laminate may be produced by using a positive electrode unit and a negative electrode unit which will be described below.

A positive electrode unit is a unit in which the solid electrolyte layer 3, the positive electrode active material layer 1B, the positive electrode current collector layer 1A, and the positive electrode active material layer 1B are laminated in this order. This positive electrode unit can be produced as follows. First, a paste for forming a solid electrolyte layer is formed into a sheet shape on a PET film by a doctor blade method and dried, and therefore the solid electrolyte layer 3 is formed. Next, a paste for forming a positive electrode active material layer is printed on the formed solid electrolyte layer 3 by screen printing and dried, and therefore the positive electrode active material layer 1B is formed.

Next, a paste for forming a positive electrode current collector layer is printed on the formed positive electrode active material layer 1B by screen printing and dried, and therefore the positive electrode current collector layer 1A is formed. In addition, the paste for forming a positive electrode active material layer is printed on the formed positive electrode current collector layer 1A again by screen printing and dried, and therefore the positive electrode active material layer 1B is formed. Then, the PET film is peeled off to produce the positive electrode unit.

A negative electrode unit is a unit in which the solid electrolyte layer 3, the negative electrode active material layer 2B, the negative electrode current collector layer 2A, and the negative electrode active material layer 2B are laminated in this order. This negative electrode unit can be produced by forming the solid electrolyte layer 3, the negative electrode active material layer 2B, the negative electrode current collector layer 2A, and the negative electrode active material layer 2B in the same procedure as that of the above-described positive electrode unit.

The positive electrode unit and the negative electrode unit are laminated to produce a green sheet laminate. In this case, lamination is carried out so that the solid electrolyte layer 3 of the positive electrode unit is in contact with the negative electrode active material layer 2B of the negative electrode unit, or the positive electrode active material layer 1B of the positive electrode unit is in contact with the solid electrolyte layer 3 of the negative electrode unit. Accordingly, the green sheet laminate is obtained, in which the positive electrode active material layer 1B, the positive electrode current collector layer 1A, the positive electrode active material layer 1B, the solid electrolyte layer 3, the negative electrode active material layer 2B, the negative electrode current collector layer 2A, the negative electrode active material layer 2B, and the solid electrolyte layer 3 are laminated in this order. Each unit is shifted to be piled up so that the positive electrode current collector layer 1A of the positive electrode unit extends toward only one end surface, and the negative electrode current collector layer 2A of the negative electrode unit extends toward only the other surface. A sheet for the solid electrolyte layer 3 having a predetermined thickness may be further piled up on both surfaces of the produced green sheet laminate.

The produced green sheet laminate is pressure-bonded at once. The pressure bonding is carried out while performing heating. A heating temperature is, for example, 40 to 95° C.

For example, the pressure-bonded green sheet laminate is heated to 500° C. to 750° C. under a nitrogen, hydrogen, and steam atmosphere to perform debinding. Thereafter, heating to 600° C. to 1000° C. under a nitrogen, hydrogen, and steam atmosphere and calcinating are performed to obtain a sintered body. A calcination time is, for example, 0.1 to 3 hours.

The obtained sintered body may be put into a cylindrical container together with an abrasive such as alumina to be subjected to barrel polishing. Accordingly, it is possible to chamfer corners of the laminate. As another method, polishing may be performed by sand blasting. This method is preferable because only a specific portion can be cut.

(Formation of Terminal)

The first external terminal 5 and the second external terminal 6 are attached to the obtained sintered body. The first external terminal 5 and the second external terminal 6 are formed so as to be in electrical contact with the positive electrode current collector layer 1A and the negative electrode current collector layer 2A, respectively. For example, the terminals can be formed by using a known method such as a sputtering method, a dipping method, or a spray coating method for the positive electrode current collector layer 1A and the negative electrode current collector layer 2A which are exposed from a side surface of the sintered body. In a case where the terminal is formed only at a predetermined portion, the terminal is formed by, for example, performing masking with a tape, or the like.

Second Embodiment

Figure 2:
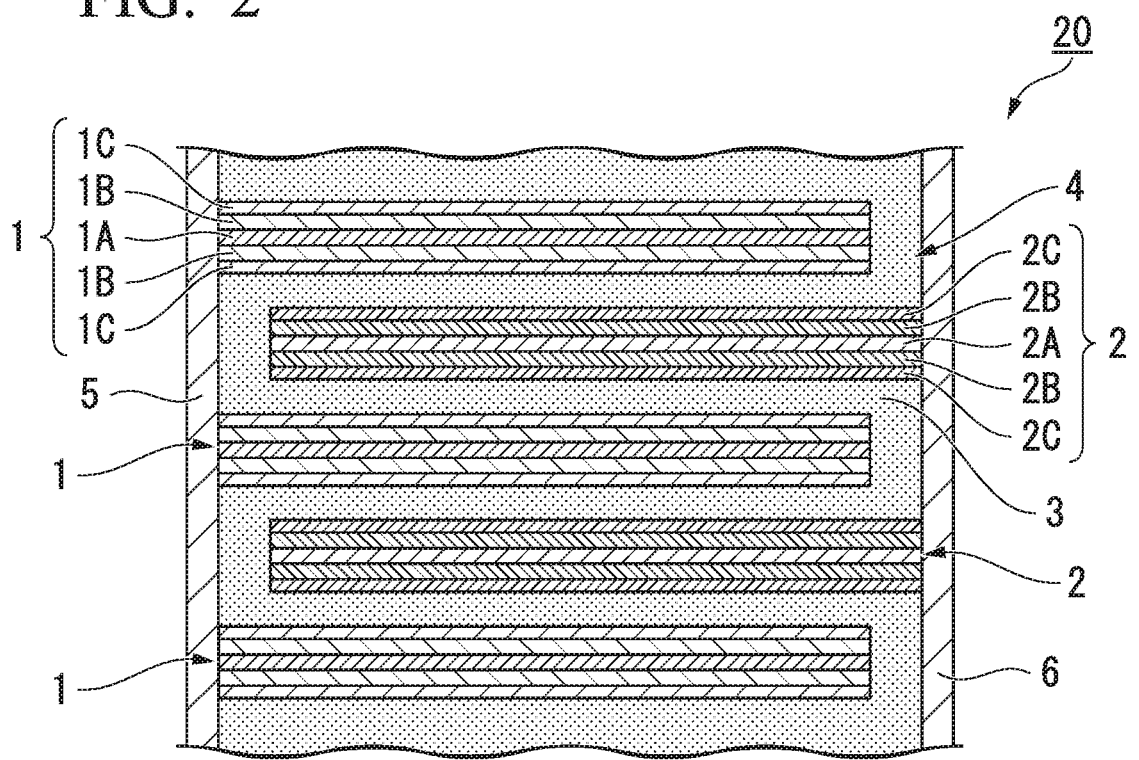
FIG. 2 is a cross-sectional schematic view showing an enlarged main part of an all solid-state lithium ion secondary battery according to a second embodiment of the present invention.

FIG. 2 is a cross-sectional schematic view showing an enlarged main part of an all solid-state lithium ion secondary battery according to a second embodiment. An all solid-state lithium ion secondary battery 20 according to the second embodiment is different from the all solid-state lithium ion secondary battery 10 according to the first embodiment in that the positive electrode layer 1 has positive electrode interlayers 1C on a surface on a side of the solid electrolyte layer 3, and the negative electrode layer 2 has negative electrode interlayers 2C on a surface on a side of the solid electrolyte layer 3. In the following description, the same reference numerals are given to the same constituent elements as those in FIG. 1, and a description thereof will be omitted.

(Interlayer)

Each of positive electrode interlayers 1C acts to increase adhesiveness between the solid electrolyte layer 3 and the positive electrode active material layer 1B, and to improve lithium ion conductivity between the solid electrolyte layer 3 and the positive electrode active material layer 1B. The negative electrode interlayer 2C acts to increase adhesiveness between the solid electrolyte layer 3 and the negative electrode active material layer 2B, and to improve lithium ion conductivity between the solid electrolyte layer 3 and the negative electrode active material layer 2B. By including the positive electrode interlayer 1C and the negative electrode interlayer 2C, an internal resistance of the all solid-state lithium ion secondary battery can be further reduced. A thicknesses of the positive electrode interlayer 1C and the negative electrode interlayer 2C is preferably within a range of 0.5 μm to 5.0 μm. By setting a thicknesses of the positive electrode interlayer 1C and the negative electrode interlayer 2C to 0.5 μm or more, it is possible to reliably improve lithium ion conductivity between the solid electrolyte layer 3 and the positive electrode active material layer 1B or the negative electrode interlayer 2C. On the other hand, by setting a thicknesses thereof to 5.0 μm or less, a migration distance of lithium ions is shortened, and therefore it is possible to further reduce an internal resistance of the all solid-state lithium ion secondary battery.

It is preferable that a composition of a compound for forming an interlayer contained in the interlayers 1C and 2C be intermediate between a composition of a compound (solid electrolyte) contained in the solid electrolyte layer 3 and a composition of a compound (electrode active material) contained in the active material layers 1B and 2B. Accordingly, a difference in compositions between the interlayers 1C and 2C, the solid electrolyte layer 3, and the active material layers 1B and 2B is further alleviated. Therefore, adhesiveness between the solid electrolyte layer 3 and the active material layers 1B and 2 B is further enhanced, thereby improving lithium ion conductivity.

The phrase "the composition is intermediate between" means that ratios of metal elements excluding Li of the compound for forming an interlayer, that is, V, Al, and Ti, are respectively between ratios of V, Al, and Ti of the electrode active material and ratios of V, Al, and Ti of the solid electrolyte. It is not necessary that ratios of V, Al, and Ti of the compound for forming an interlayer are average values of ratios of V, Al, and Ti of the active material and ratios of V, Al, and Ti of the solid electrolyte.

The compound for forming an interlayer is preferably a compound represented by the general formula (3).

$$Li_kV_mAl_nTi_qP_rO_{12} \quad (3)$$

Here, k, m, n, q, and r in the general formula (3) are numbers satisfying $0.5 \leq k \leq 3.0$, $1.00 \leq m \leq 1.20$, $0.06 \leq n \leq 0.09$, $0.60 \leq q \leq 1.40$, and $2.80 \leq r \leq 3.20$. It is particularly preferable that k, m, n, q, and r be numbers satisfying $0.8 \leq k \leq 3.0$, $1.00 \leq m \leq 1.20$, $0.06 \leq n \leq 0.09$, $0.60 \leq q \leq 1.40$, and $2.90 \leq r \leq 3.10$.

A compositional ratio of the compound represented by the general formula (3) can be obtained in the same manner as in the case of the compound of The general formula (1).

In addition, a condition that the interlayers 1C and 2C are provided can be confirmed by using elemental analyzers such as SEM-EDS, STEM-EDS, or EPMA.

It is preferable that a crystal structure of the compound contained in the interlayers 1C and 2C have the same crystal structure as at least one of the solid electrolyte and the electrode active material. The term "the same crystal structure" means to have the same space group. When the crystal structure is the same, distortion is hardly generated at an interface, and therefore adhesiveness between the solid electrolyte and the active material layer can be further enhanced.

The all solid-state lithium ion secondary battery having an interlayer can be manufactured by, for example, a method in which a green sheet of an interlayer is produced to be disposed between a green sheet of the active material layer and a green sheet of the current collector layer. The other procedures are the same procedures as in a case where no interlayer is included.

Hereinbefore, the embodiments of the present invention have been described in detail with reference to the drawings, but each configuration and combination thereof, and the like in each embodiment is an example. Additions, omissions, substitutions, and other modifications can be made without departing from the spirit of the present invention.

For example, in the present embodiment, both electrode layers of the pair of electrode layers (the positive electrode layer 1 and the negative electrode layer 2) have the active material layer containing the compound represented by the general formula (1), but it is sufficient as long as at least one electrode layer of the pair of electrode layers has the active material layer containing the compound represented by the general formula (1).

EXAMPLES

Example 1

(Manufacture of Electrode Active Material Powder)

First, $Li_2CO_3$ powder, $V_2O_5$ powder, $Al_2O_3$ powder, $TiO_2$ powder, and $NH_4H_2PO_4$ powder were prepared as raw material powders. These raw material powders were weighed so that an atomic ratio of Li, V, Al, Ti, and P became 2.55:1.50:0.05:0.45:3.00 (=Li:V:Al:Ti:P), wet-blended by a ball mill for 16 hours, and then dehydrated and dried, thereby obtaining a powder mixture. The obtained powder mixture was calcined in air at 800° C. for 2 hours, and therefore a calcined product was obtained. Then, the obtained calcined product was subjected to wet grinding by a ball mill for 16 hours, and then dehydrated and dried, thereby obtaining a powder of an electrode active material. A composition and a crystal structure of the obtained electrode active material powder were measured. As a result, the composition was $Li_{2.55}V_{1.50}Al_{0.05}Ti_{0.45}P_{3.00}O_{12}$. In addition, the crystal structure was the same crystal structure as lithium vanadium phosphate in the monoclinic phase.

(Manufacture of Solid Electrolyte Powder)

A solid electrolyte powder was obtained in the same manner as in the manufacture of the electrode active material powder except that the raw material powder was weighed so that an atomic ratio of Li, V, Al, Ti, and P became 1.00:0.05:0.12:1.70:3.00. A composition and a crystal structure of the obtained solid electrolyte powder were measured. As a result, the composition was $Li_{1.00}V_{0.05}Al_{0.12}Ti_{1.70}P_{3.00}O_{12}$. In addition, the crystal structure was the same crystal structure as lithium aluminum titanium phosphate.

(Preparation of Paste for Forming Electrode Active Material Layer)

The electrode active material powder manufactured as described above was dispersed in a vehicle containing terpineol as a solvent, a nonaqueous dispersant as a dispersant, and ethyl cellulose as a binder, thereby preparing a paste for forming an electrode active material layer.

(Preparation of Paste for Forming Solid Electrolyte Layer)

A paste for forming a solid electrolyte layer was prepared in the same manner as in the preparation of the paste for forming an electrode active material layer by using the solid electrolyte powder manufactured as described above.

(Preparation of Paste for Forming Current Collector Layer)

A paste for forming a current collector layer was prepared in the same manner as in the preparation of the paste for forming an electrode active material layer by using a mixed powder obtained by mixing a copper powder and the electrode active material powder manufactured as described above at a ratio of 80/20.

(Production of Positive Electrode Unit)

A positive electrode unit was produced using the paste for forming an electrode active material layer, the paste for forming a solid electrolyte layer, and the paste for forming a current collector layer which were prepared as described above.

First, the paste for forming a solid electrolyte layer was formed into a sheet shape on a PET film by a doctor blade method and dried, and therefore a solid electrolyte layer 3 was formed. Next, the paste for forming an electrode active material layer was printed thereon by screen printing and dried, and therefore a positive electrode active material layer 1B was formed. Next, the current collector layer formation paste was printed thereon by screen printing and dried, and therefore a positive electrode current collector layer 1A was formed. In addition, the paste for forming an electrode active material layer was printed thereon again by screen printing and dried, and therefore a positive electrode active material layer 1B was formed. Then, the PET film was peeled off to produce a positive electrode unit in which the solid electrolyte layer 3, the positive electrode active material layer 1B, the positive electrode current collector layer 1A, and the positive electrode active material layer 1B were laminated in this order. 26 positive electrode units were produced.

(Production of Negative Electrode Unit)

A negative electrode unit was produced using the paste for forming an electrode active material layer, the paste for forming a solid electrolyte layer, and the paste for forming a current collector layer which were prepared as described above.

First, the paste for forming a solid electrolyte layer was formed into a sheet shape on a PET film by a doctor blade method and dried, and therefore a solid electrolyte layer 3 was formed. Next, the paste for forming an electrode active material layer was printed thereon and dried, and therefore a negative electrode active material layer 2B was formed. Next, the current collector layer formation paste was printed thereon by screen printing and dried, and therefore a negative electrode current collector layer 2A was formed. In addition, the paste for forming an electrode active material layer was printed thereon again by screen printing and dried, and therefore a negative electrode active material layer 2B was formed. Then, the PET film was peeled off to produce a negative electrode unit in which the solid electrolyte layer 3, the negative electrode active material layer 2B, the negative electrode current collector layer 2A, and the negative electrode active material layer 2B were laminated in this order. 25 negative electrode units were produced.

(Production of all Solid-State Lithium Ion Secondary Battery)

The positive electrode unit and the negative electrode unit which were produced as described above were alternately piled up to form a green sheet laminate consisting of 16 positive electrode units and 15 negative electrode units. The formed laminate was simultaneously calcined after debinding at 650° C., and therefore a sintered body was obtained. A temperature of simultaneous calcination was 800° C., and a calcination time was 1 hour.

An InGa electrode paste was applied to each of the positive electrode current collector layer 1A and the negative electrode current collector layer 2A of the obtained sintered body and dried. A first external terminal 5 was attached to the positive electrode current collector layer 1A, and a second external terminal 6 was attached to the negative electrode current collector layer 2A, and therefore an all solid-state lithium ion secondary battery was manufactured.

A layer thicknesses of the positive electrode active material layer, the solid electrolyte layer, and the negative electrode active material layer of the obtained all solid-state lithium ion secondary battery was measured. The results are shown in Table 1 together with the composition of each layer.

(Evaluation of all Solid-State Lithium Ion Secondary Battery)

Battery capacity and internal resistance of the obtained all solid-state lithium ion secondary battery were measured by charging and discharging at a constant current by using a charge and discharge measuring machine. A charge and discharge current was 30 μA, and a cutoff voltage during charging and discharging were 1.8 V and 0 V, respectively. In addition, a pause time after charging and after discharging was set to 1 minute. An internal resistance was obtained by dividing a difference (IR drop) between an open-circuit voltage after the pause of charging (immediately before the start of discharging) and a voltage after 1 second from the start of discharging, by a current value at the time of discharging. The results are shown in Table 1.

Example 2

(Manufacture of Electrode Active Material Powder)

An electrode active material powder was obtained in the same manner as in Example 1 except that the raw material powder was weighed so that an atomic ratio of Li, V, Al, Ti, and P became 0.70:1.70:0.05:0.55:3.15 in the manufacture of the electrode active material powder of Example 1. In the obtained electrode active material powder, a composition was $Li_{0.70}V_{1.70}Al_{0.05}Ti_{0.55}P_{3.15}O_{12}$, and a crystal structure was the same crystal structure as lithium vanadium phosphate in the monoclinic phase.

(Manufacture of Solid Electrolyte Powder)

A solid electrolyte powder was obtained in the same manner as in Example 1 except that the raw material powder was weighed so that an atomic ratio of Li, V, Al, Ti, and P became 0.50:0.05:0.20:2.00:2.80 in the manufacture of the solid electrolyte powder of Example 1. In the obtained solid electrolyte powder, a composition was $Li_{0.50}V_{0.05}Al_{0.20}Ti_{2.00}P_{2.80}O_{12}$, and a crystal structure was the same crystal structure as lithium aluminum titanium phosphate.

(Production and Evaluation of all Solid-State Lithium Ion Secondary Battery)

An all solid-state lithium ion secondary battery was manufactured in the same manner as in Example 1 except that the electrode active material powder and the solid electrolyte powder manufactured as described above were used. A layer thickness, battery capacity, and internal resistance of the positive electrode active material layer, the solid electrolyte layer, and the negative electrode active material layer were measured. The results are shown in Table 1.

Example 3

(Manufacture of Electrode Active Material Powder)

An electrode active material powder was obtained in the same manner as in Example 1 except that the raw material powder was weighed so that an atomic ratio of Li, V, Al, Ti, and P became 0.50:1.85:0.04:0.55:3.10 in the manufacture of the electrode active material powder of Example 1. In the obtained electrode active material powder, a composition was $Li_{0.50}V_{1.85}Al_{0.04}Ti_{0.55}P_{3.10}O_{12}$, and a crystal structure was the same crystal structure as lithium vanadium phosphate in the monoclinic phase.

(Production and Evaluation of all Solid-State Lithium Ion Secondary Battery)

An all solid-state lithium ion secondary battery was manufactured in the same manner as in Example 1 except that the electrode active material powder manufactured as described above was used. A layer thickness, battery capacity, and internal resistance of the positive electrode active material layer, the solid electrolyte layer, and the negative electrode active material layer were measured. The results are shown in Table 1.

Example 4

(Manufacture of Electrode Active Material Powder)

An electrode active material powder was obtained in the same manner as in Example 1 except that the raw material powder was weighed so that an atomic ratio of Li, V, Al, Ti, and P became 1.70:2.00:0.05:0.40:2.90 in the manufacture of the electrode active material powder of Example 1. In the obtained electrode active material powder, a composition was $Li_{1.70}V_{2.00}Al_{0.05}Ti_{0.40}P_{2.90}O_{12}$, and a crystal structure was the same crystal structure as lithium vanadium phosphate in the monoclinic phase.

(Production and Evaluation of all Solid-State Lithium Ion Secondary Battery)

An all solid-state lithium ion secondary battery was manufactured in the same manner as in Example 1 except that the electrode active material powder manufactured as described above was used. A layer thickness, battery capacity, and internal resistance of the positive electrode active material layer, the solid electrolyte layer, and the negative electrode active material layer were measured. The results are shown in Table 1.

Example 5

(Manufacture of Electrode Active Material Powder)

An electrode active material powder was obtained in the same manner as in Example 1 except that the raw material powder was weighed so that an atomic ratio of Li, V, Al, Ti, and P became 2.20:1.60:0.01:0.50:3.00 in the manufacture of the electrode active material powder of Example 1. In the obtained electrode active material powder, a composition was $Li_{2.20}V_{1.60}Al_{0.01}Ti_{0.50}P_{3.00}O_{12}$, and a crystal structure was the same crystal structure as lithium vanadium phosphate in the monoclinic phase.

(Production and Evaluation of all Solid-State Lithium Ion Secondary Battery)

An all solid-state lithium ion secondary battery was manufactured in the same manner as in Example 1 except that the electrode active material powder manufactured as described above was used. A layer thickness, battery capacity, and internal resistance of the positive electrode active material layer, the solid electrolyte layer, and the negative electrode active material layer were measured. The results are shown in Table 1.

Example 6

(Manufacture of Electrode Active Material Powder)

An electrode active material powder was obtained in the same manner as in Example 1 except that the raw material powder was weighed so that an atomic ratio of Li, V, Al, Ti, and P became 2.60:1.90:0.04:0.01:3.10 in the manufacture of the electrode active material powder of Example 1. In the obtained electrode active material powder, a composition was $Li_{2.60}V_{1.90}Al_{0.04}Ti_{0.01}P_{3.10}O_{12}$, and a crystal structure was the same crystal structure as lithium vanadium phosphate in the monoclinic phase.

(Production and Evaluation of all Solid-State Lithium Ion Secondary Battery)

An all solid-state lithium ion secondary battery was manufactured in the same manner as in Example 1 except that the electrode active material powder manufactured as described above was used. A layer thickness, battery capacity, and internal resistance of the positive electrode active material layer, the solid electrolyte layer, and the negative electrode active material layer were measured. The results are shown in Table 1.

Example 7

(Manufacture of Electrode Active Material Powder)
An electrode active material powder was obtained in the same manner as in Example 1 except that the raw material powder was weighed so that an atomic ratio of Li, V, Al, Ti, and P became 2.40:1.80:0.05:0.50:2.80 in the manufacture of the electrode active material powder of Example 1. In the obtained electrode active material powder, a composition was $Li_{2.40}V_{1.80}Al_{0.05}Ti_{0.50}P_{2.80}O_{12}$, and a crystal structure was the same crystal structure as lithium vanadium phosphate in the monoclinic phase.

(Production and Evaluation of all Solid-State Lithium Ion Secondary Battery)
An all solid-state lithium ion secondary battery was manufactured in the same manner as in Example 1 except that the electrode active material powder manufactured as described above was used. A layer thickness, battery capacity, and internal resistance of the positive electrode active material layer, the solid electrolyte layer, and the negative electrode active material layer were measured. The results are shown in Table 1.

Example 8

(Manufacture of Electrode Active Material Powder)
An electrode active material powder was obtained in the same manner as in Example 1 except that the raw material powder was weighed so that an atomic ratio of Li, V, Al, Ti, and P became 2.10:1.40:0.04:0.40:3.20 in the manufacture of the electrode active material powder of Example 1. In the obtained electrode active material powder, a composition was $Li_{2.10}V_{1.40}Al_{0.04}Ti_{0.40}P_{3.20}O_{12}$, and a crystal structure was the same crystal structure as lithium vanadium phosphate in the monoclinic phase.

(Production and Evaluation of all Solid-State Lithium Ion Secondary Battery)
An all solid-state lithium ion secondary battery was manufactured in the same manner as in Example 1 except that the electrode active material powder manufactured as described above was used. A layer thickness, battery capacity, and internal resistance of the positive electrode active material layer, the solid electrolyte layer, and the negative electrode active material layer were measured. The results are shown in Table 1.

Example 9

(Manufacture of Solid Electrolyte Powder)
A solid electrolyte powder was obtained in the same manner as in Example 1 except that the raw material powder was weighed so that an atomic ratio of Li, V, Al, Ti, and P became 0.50:0.05:0.12:1.90:3.00 in the manufacture of the solid electrolyte powder of Example 1. In the obtained solid electrolyte powder, a composition was $Li_{0.50}V_{0.05}Al_{0.12}Ti_{1.90}P_{3.00}O_{12}$, and a crystal structure was the same crystal structure as lithium aluminum titanium phosphate.

(Production and Evaluation of all Solid-State Lithium Ion Secondary Battery)
An all solid-state lithium ion secondary battery was manufactured in the same manner as in Example 1 except that the solid electrolyte powder manufactured as described above was used. A layer thickness, battery capacity, and internal resistance of the positive electrode active material layer, the solid electrolyte layer, and the negative electrode active material layer were measured. The results are shown in Table 1.

Example 10

(Manufacture of Solid Electrolyte Powder)
A solid electrolyte powder was obtained in the same manner as in Example 1 except that the raw material powder was weighed so that an atomic ratio of Li, V, Al, Ti, and P became 1.00:0.95:0.10:1.40:2.90 in the manufacture of the solid electrolyte powder of Example 1. In the obtained solid electrolyte powder, a composition was $Li_{1.00}V_{0.95}Al_{0.10}Ti_{1.40}P_{2.90}O_{12}$, and a crystal structure was the same crystal structure as lithium aluminum titanium phosphate.

(Production and Evaluation of all Solid-State Lithium Ion Secondary Battery)
An all solid-state lithium ion secondary battery was manufactured in the same manner as in Example 1 except that the solid electrolyte powder manufactured as described above was used. A layer thickness, battery capacity, and internal resistance of the positive electrode active material layer, the solid electrolyte layer, and the negative electrode active material layer were measured. The results are shown in Table 1.

Example 11

(Manufacture of Solid Electrolyte Powder)
A solid electrolyte powder was obtained in the same manner as in Example 1 except that the raw material powder was weighed so that an atomic ratio of Li, V, Al, Ti, and P became 1.00:0.30:0.12:1.90:2.80 in the manufacture of the solid electrolyte powder of Example 1. In the obtained solid electrolyte powder, a composition was $Li_{1.00}V_{0.30}Al_{0.12}Ti_{1.90}P_{2.80}O_{12}$, and a crystal structure was the same crystal structure as lithium aluminum titanium phosphate.

(Production and Evaluation of all Solid-State Lithium Ion Secondary Battery)
An all solid-state lithium ion secondary battery was manufactured in the same manner as in Example 1 except that the solid electrolyte powder manufactured as described above was used. A layer thickness, battery capacity, and internal resistance of the positive electrode active material layer, the solid electrolyte layer, and the negative electrode active material layer were measured. The results are shown in Table 1.

Example 12

(Manufacture of Solid Electrolyte Powder)
A solid electrolyte powder was obtained in the same manner as in Example 1 except that the raw material powder was weighed so that an atomic ratio of Li, V, Al, Ti, and P became 1.00:0.05:0.12:1.60:3.20 in the manufacture of the solid electrolyte powder of Example 1. In the obtained solid electrolyte powder, a composition was $Li_{1.00}V_{0.05}Al_{0.12}Ti_{1.60}P_{3.20}O_{12}$, and a crystal structure was the same crystal structure as lithium aluminum titanium phosphate.

(Production and Evaluation of all Solid-State Lithium Ion Secondary Battery)

An all solid-state lithium ion secondary battery was manufactured in the same manner as in Example 1 except that the solid electrolyte powder manufactured as described above was used. A layer thickness, battery capacity, and internal resistance of the positive electrode active material layer, the solid electrolyte layer, and the negative electrode active material layer were measured. The results are shown in Table 1.

Example 13

(Manufacture of Electrode Active Material Powder)

An electrode active material powder was obtained in the same manner as in Example 1 except that the $Li_2CO_3$ powder, $V_2O_5$ powder, and $NH_4H_2PO_4$ powder were weighed so that an atomic ratio of Li, V, and P became 2.90:2.00:3.00 (=Li:V:P) in the manufacture of the electrode active material powder of Example 1. In the obtained electrode active material powder, a composition was $Li_{2.90}V_{2.00}P_{3.00}O_{12}$, and a crystal structure was the same crystal structure as lithium vanadium phosphate in the monoclinic phase.

(Manufacture and Evaluation of all Solid-State Lithium Ion Secondary Battery)

A negative electrode unit was prepared in the same manner as in Example 1 except that the electrode active material powder manufactured as described above was used. An all solid-state lithium ion secondary battery was manufactured in the same manner as in Example 1 except that this negative electrode unit was used. A layer thickness, battery capacity, and internal resistance of the positive electrode active material layer, the solid electrolyte layer, and the negative electrode active material layer were measured. The results are shown in Table 1.

Example 14

(Manufacture of Powder for Forming Interlayer)

A powder for forming an interlayer was obtained in the same manner as in the manufacture of the electrode active material powder except that the $Li_2CO_3$ powder, $V_2O_5$ powder, $Al_2O_3$ powder, $TiO_2$ powder, and $NH_4H_2PO_4$ powder were weighed so that an atomic ratio of Li, V, Al, Ti, and P became 1.50:1.10:0.08:1.00:3.00 (=Li:V:Al:Ti:P). In the obtained electrode active material powder, a composition was $Li_{1.50}V_{1.10}Al_{0.08}Ti_{1.00}P_{3.00}O_{12}$, and a crystal structure was the same crystal structure as lithium vanadium phosphate in the monoclinic phase.

(Preparation of Paste for Forming Interlayer)

A paste for forming an interlayer was prepared in the same manner as in the preparation of the paste for forming an electrode active material layer by using the powder for forming an interlayer manufactured as described above.

(Production of Positive Electrode Unit)

A positive electrode unit was produced using the paste for forming an interlayer prepared as described above, and the paste for forming an electrode active material layer, the paste for forming a solid electrolyte layer, and the past[e for forming a current collector layer which were prepared in Example 1.

First, the paste for forming a solid electrolyte layer was formed into a sheet shape on a PET film by a doctor blade method and dried, and therefore a solid electrolyte layer 3 was formed. Next, the paste for forming an interlayer was printed thereon by screen printing and dried, and therefore a positive electrode interlayer 1C was formed. Next, the paste for forming an electrode active material layer was printed thereon by screen printing and dried, and therefore a positive electrode active material layer 1B was formed. Next, the current collector layer formation paste was printed thereon by screen printing and dried, and therefore a positive electrode current collector layer 1A was formed. Next, the paste for forming an electrode active material layer was printed thereon again by screen printing and dried, and therefore a positive electrode active material layer 1B was formed. In addition, the paste for forming a positive electrode interlayer was printed thereon again by screen printing and dried, and therefore a positive electrode interlayer 1C was formed. Then, the PET film was peeled off to produce a positive electrode unit in which the solid electrolyte layer 3, the positive electrode interlayer 1C, the positive electrode active material layer 1B, the positive electrode current collector layer 1A, the positive electrode active material layer 1B, and the positive electrode interlayer 1C were laminated in this order.

(Manufacture and Evaluation of all Solid-State Lithium Ion Secondary Battery)

An all solid-state lithium ion secondary battery was manufactured in the same manner as in Example 1 except that the positive electrode unit produced as described above was used. A layer thickness, battery capacity, and internal resistance of the positive electrode active material layer, the positive electrode interlayer, the solid electrolyte layer, and the negative electrode active material layer were measured. The results are shown in Table 2.

Example 15

An all solid-state lithium ion secondary battery was manufactured in the same manner as in Example 14 except that the electrode active material powder ($Li_{1.70}V_{2.00}Al_{0.05}Ti_{0.40}P_{2.90}O_{12}$ powder) manufactured in Example 4 was used. A layer thickness, battery capacity, and internal resistance of the positive electrode active material layer, the positive electrode interlayer, the solid electrolyte layer, and the negative electrode active material layer were measured. The results are shown in Table 2.

Example 16

(Manufacture of Electrode Active Material Powder)

An electrode active material powder was obtained in the same manner as in Example 1 except that the raw material powder was weighed so that an atomic ratio of Li, V, Al, Ti, and P became 2.00:1.10:0.07:1.00:2.90 in the manufacture of the electrode active material powder of Example 1. In the obtained electrode active material powder, a composition was $Li_{2.00}V_{1.10}Al_{0.07}Ti_{1.00}P_{2.90}O_{12}$, and a crystal structure was the same crystal structure as lithium vanadium phosphate in the monoclinic phase.

(Production and Evaluation of all Solid-State Lithium Ion Secondary Battery)

An all solid-state lithium ion secondary battery was manufactured in the same manner as in Example 14 except that the electrode active material powder manufactured as described above was used. A layer thickness, battery capacity, and internal resistance of the positive electrode active material layer, the positive electrode interlayer, the solid electrolyte layer, and the negative electrode active material layer were measured. The results are shown in Table 2.

Comparative Example 1

A positive electrode unit and a negative electrode unit were produced in the same manner as in Example 1 except that the electrode active material powder ($Li_{2.90}V_{2.00}P_{3.00}O_{12}$ powder) manufactured in Example 13 was used. An all solid-state lithium ion secondary battery was manufactured in the same manner as in Example 1 except that these positive electrode unit and negative electrode unit were used. A battery capacity and internal resistance were measured. The results are shown in Table 2 together with the compositions of the positive electrode active material layer, the solid electrolyte layer, and the negative electrode active material layer.

Comparative Example 2

(Manufacture of Electrode Active Material Powder)

An electrode active material powder was obtained in the same manner as in Example 1 except that the raw material powder was weighed so that an atomic ratio of Li, V, Al, Ti, and P became 0.40:1.80:0.10:1.10:2.70 in the manufacture of the electrode active material powder of Example 1. A composition of the obtained electrode active material powder was $Li_{0.40}V_{1.80}Al_{0.10}Ti_{1.10}P_{2.70}O_{12}$.

(Manufacture of Solid Electrolyte Powder)

A solid electrolyte powder was obtained in the same manner as in Example 1 except that the raw material powder was weighed so that an atomic ratio of Li, V, Al, Ti, and P became 0.45:0.30:0.15:2.10:2.75 in the manufacture of the solid electrolyte powder of Example 1. A composition of the obtained solid electrolyte powder was $Li_{0.45}V_{0.30}Al_{0.15}Ti_{2.10}P_{2.75}O_{12}$.

(Production and Evaluation of all Solid-State Lithium Ion Secondary Battery)

An all solid-state lithium ion secondary battery was manufactured in the same manner as in Example 1 except that the electrode active material powder and the solid electrolyte powder manufactured as described above were used. A battery capacity and internal resistance were measured. The results are shown in Table 2 together with the compositions of the positive electrode active material layer, the solid electrolyte layer, and the negative electrode active material layer.

TABLE 1

| | | Composition | | | | | | Layer thickness (μm) | Battery capacity (μAh) | Internal resistance (kΩ) |
|---|---|---|---|---|---|---|---|---|---|---|
| | | Li | V | Al | Ti | P | O | | | |
| Example 1 | Positive electrode active material layer | 2.55 | 1.50 | 0.05 | 0.45 | 3.00 | 12 | 2.81 | 112.1 | 0.94 |
| | Solid electrolyte layer | 1.00 | 0.05 | 0.12 | 1.70 | 3.00 | 12 | 10.22 | | |
| | Negative electrode active material layer | 2.55 | 1.50 | 0.05 | 0.45 | 3.00 | 12 | 2.92 | | |
| Example 2 | Positive electrode active material layer | 0.70 | 1.70 | 0.05 | 0.55 | 3.15 | 12 | 2.87 | 86.3 | 3.22 |
| | Solid electrolyte layer | 0.50 | 0.05 | 0.20 | 2.00 | 2.80 | 12 | 10.11 | | |
| | Negative electrode active material layer | 0.70 | 1.70 | 0.05 | 0.55 | 3.15 | 12 | 2.87 | | |
| Example 3 | Positive electrode active material layer | 0.50 | 1.85 | 0.04 | 0.55 | 3.10 | 12 | 2.79 | 93.2 | 2.16 |
| | Solid electrolyte layer | 1.00 | 0.05 | 0.12 | 1.70 | 3.00 | 12 | 10.29 | | |
| | Negative electrode active material layer | 0.50 | 1.85 | 0.04 | 0.55 | 3.10 | 12 | 2.83 | | |
| Example 4 | Positive electrode active material layer | 1.70 | 2.00 | 0.05 | 0.40 | 2.90 | 12 | 2.73 | 95.7 | 1.78 |
| | Solid electrolyte layer | 1.00 | 0.05 | 0.12 | 1.70 | 3.00 | 12 | 10.26 | | |
| | Negative electrode active material layer | 1.70 | 2.00 | 0.05 | 0.40 | 2.90 | 12 | 2.83 | | |
| Example 5 | Positive electrode active material layer | 2.20 | 1.60 | 0.01 | 0.50 | 3.00 | 12 | 2.77 | 96.8 | 1.68 |
| | Solid electrolyte layer | 1.00 | 0.05 | 0.12 | 1.70 | 3.00 | 12 | 10.31 | | |
| | Negative electrode active material layer | 2.20 | 1.60 | 0.01 | 0.50 | 3.00 | 12 | 2.91 | | |
| Example 6 | Positive electrode active material layer | 2.60 | 1.90 | 0.04 | 0.01 | 3.10 | 12 | 2.83 | 96.9 | 1.66 |
| | Solid electrolyte layer | 1.00 | 0.05 | 0.12 | 1.70 | 3.00 | 12 | 10.33 | | |
| | Negative electrode active material layer | 2.60 | 1.90 | 0.04 | 0.01 | 3.10 | 12 | 2.88 | | |
| Example 7 | Positive electrode active material layer | 2.40 | 1.80 | 0.05 | 0.50 | 2.80 | 12 | 2.86 | 97.5 | 1.62 |
| | Solid electrolyte layer | 1.00 | 0.05 | 0.12 | 1.70 | 3.00 | 12 | 10.27 | | |
| | Negative electrode active material layer | 2.40 | 1.80 | 0.05 | 0.50 | 2.80 | 12 | 2.79 | | |
| Example 8 | Positive electrode active material layer | 2.10 | 1.40 | 0.04 | 0.40 | 3.20 | 12 | 2.75 | 95.2 | 1.63 |
| | Solid electrolyte layer | 1.00 | 0.05 | 0.12 | 1.70 | 3.00 | 12 | 10.23 | | |
| | Negative electrode active material layer | 2.10 | 1.40 | 0.04 | 0.40 | 3.20 | 12 | 2.84 | | |
| Example 9 | Positive electrode active material layer | 2.55 | 1.50 | 0.05 | 0.45 | 3.00 | 12 | 2.83 | 94.4 | 1.78 |
| | Solid electrolyte layer | 0.50 | 0.05 | 0.12 | 1.90 | 3.00 | 12 | 10.16 | | |
| | Negative electrode active material layer | 2.55 | 1.50 | 0.05 | 0.45 | 3.00 | 12 | 2.84 | | |

TABLE 1-continued

|  |  | Composition | | | | | | Layer thickness (μm) | Battery capacity (μAh) | Internal resistance (kΩ) |
|---|---|---|---|---|---|---|---|---|---|---|
|  |  | Li | V | Al | Ti | P | O | | | |
| Example 10 | Positive electrode active material layer | 2.55 | 1.50 | 0.05 | 0.45 | 3.00 | 12 | 2.78 | 94.1 | 1.83 |
|  | Solid electrolyte layer | 1.00 | 0.95 | 0.10 | 1.40 | 2.90 | 12 | 10.15 | | |
|  | Negative electrode active material layer | 2.55 | 1.50 | 0.05 | 0.45 | 3.00 | 12 | 2.98 | | |
| Example 11 | Positive electrode active material layer | 2.55 | 1.50 | 0.05 | 0.45 | 3.00 | 12 | 2.84 | 93.2 | 1.59 |
|  | Solid electrolyte layer | 1.00 | 0.30 | 0.12 | 1.90 | 2.80 | 12 | 10.18 | | |
|  | Negative electrode active material layer | 2.55 | 1.50 | 0.05 | 0.45 | 3.00 | 12 | 2.88 | | |
| Example 12 | Positive electrode active material layer | 2.55 | 1.50 | 0.05 | 0.45 | 3.00 | 12 | 2.89 | 95.4 | 1.73 |
|  | Solid electrolyte layer | 1.00 | 0.05 | 0.12 | 1.60 | 3.20 | 12 | 10.12 | | |
|  | Negative electrode active material layer | 2.55 | 1.50 | 0.05 | 0.45 | 3.00 | 12 | 2.87 | | |
| Example 13 | Positive electrode active material layer | 2.55 | 1.50 | 0.05 | 0.45 | 3.00 | 12 | 2.86 | 89.8 | 2.42 |
|  | Solid electrolyte layer | 1.00 | 0.05 | 0.12 | 1.70 | 3.00 | 12 | 10.21 | | |
|  | Negative electrode active material layer | 2.90 | 2.00 | 0.00 | 0.00 | 3.00 | 12 | 2.85 | | |

TABLE 2

|  |  | Composition | | | | | | Layer thickness (μm) | Battery capacity (μAh) | Internal resistance (kΩ) |
|---|---|---|---|---|---|---|---|---|---|---|
|  |  | Li | V | Al | Ti | P | O | | | |
| Example 14 | Positive electrode active material layer | 2.55 | 1.50 | 0.05 | 0.45 | 3.00 | 12 | 2.72 | 101.7 | 0.73 |
|  | Positive electrode interlayer | 1.50 | 1.10 | 0.08 | 1.00 | 3.00 | 12 | 0.82 | | |
|  | Solid electrolyte layer | 1.00 | 0.05 | 0.12 | 1.70 | 3.00 | 12 | 10.14 | | |
|  | Negative electrode active material layer | 2.55 | 1.50 | 0.05 | 0.45 | 3.00 | 12 | 2.91 | | |
| Example 15 | Positive electrode active material layer | 1.70 | 2.00 | 0.05 | 0.40 | 2.90 | 12 | 2.79 | 98.4 | 1.16 |
|  | Positive electrode interlayer | 1.50 | 1.10 | 0.08 | 1.00 | 3.00 | 12 | 0.74 | | |
|  | Solid electrolyte layer | 1.00 | 0.05 | 0.12 | 1.70 | 3.00 | 12 | 10.22 | | |
|  | Negative electrode active material layer | 1.70 | 2.00 | 0.05 | 0.40 | 2.90 | 12 | 3.01 | | |
| Example 16 | Positive electrode active material layer | 2.00 | 1.10 | 0.07 | 1.00 | 2.90 | 12 | 2.89 | 99.3 | 1.02 |
|  | Positive electrode interlayer | 1.50 | 1.10 | 0.08 | 1.00 | 3.00 | 12 | 0.83 | | |
|  | Solid electrolyte layer | 1.00 | 0.05 | 0.12 | 1.60 | 3.20 | 12 | 10.15 | | |
|  | Negative electrode active material layer | 2.00 | 1.10 | 0.07 | 1.00 | 2.90 | 12 | 2.88 | | |
| Comparative example 1 | Positive electrode active material layer | 2.90 | 2.00 | 0.00 | 0.00 | 3.00 | 12 | 2.77 | 22.1 | 13.22 |
|  | Solid electrolyte layer | 1.00 | 0.05 | 0.12 | 1.70 | 3.00 | 12 | 10.18 | | |
|  | Negative electrode active material layer | 2.90 | 2.00 | 0.00 | 0.00 | 3.00 | 12 | 2.81 | | |
| Comparative example 2 | Positive electrode active material layer | 0.40 | 1.80 | 0.10 | 1.10 | 2.70 | 12 | 2.74 | 10.5 | 15.12 |
|  | Solid electrolyte layer | 0.45 | 0.30 | 0.15 | 2.10 | 2.75 | 12 | 10.23 | | |
|  | Negative electrode active material layer | 0.40 | 1.80 | 0.10 | 1.10 | 2.70 | 12 | 2.88 | | |

The all solid-state lithium ion secondary batteries obtained in Comparative Examples 1 and 2 had a high internal resistance and low battery capacity. It is presumed that the reason for this is because the material compositions of the positive electrode active material layer and the solid electrolyte layer, and of the negative electrode active material layer and the solid electrolyte layer are greatly different, thereby making ionic conductivity of lithium ions between the layers low.

On the other hand, the all solid-state lithium ion secondary batteries obtained in Examples 1 to 16, in which the positive electrode active material and the solid electrolyte had the compositions specified in the present invention, had a low internal resistance and high battery capacity. In particular, the all solid-state lithium ion secondary batteries obtained in Examples 1 to 12, in which the positive electrode active material, the negative electrode active material, and the solid electrolyte had the compositions specified in the present invention, had a low internal resistance and high battery capacity. Furthermore, the all solid-state lithium ion secondary batteries obtained in Examples 14 to 16, which have the positive electrode interlayer on the surface on the side of the solid electrolyte layer of the positive electrode active material layer, had a low internal resistance and high battery capacity.

INDUSTRIAL APPLICABILITY

By further reducing an internal resistance of the all solid-state lithium ion battery, an output current of the all solid-state lithium ion battery can be further increased.

REFERENCE SIGNS LIST

1 Positive electrode layer
1A Positive electrode current collector layer
1B Positive electrode active material layer
1C Positive electrode interlayer
2 Negative electrode layer
2A Negative electrode current collector layer
2B Negative electrode active material layer
2C Negative electrode interlayer
3 Solid electrolyte layer
4 Laminate
5 First external terminal
6 Second external terminal
10, 20 All solid-state lithium ion secondary battery

The invention claimed is:
1. An all-solid lithium ion secondary battery comprising:
a pair of electrode layers; and
a solid electrolyte layer provided between the pair of electrode layers,
wherein at least one electrode layer of the pair of electrode layers has an active material layer containing a compound represented by a general formula (1), and
the solid electrolyte layer contains a compound represented by a general formula (2),

$$Li_aV_bAl_cTi_dP_eO_{12} \quad (1),$$

where a, b, c, d, and e in the general formula (1) are numbers satisfying $0.5 \leq a \leq 3.0$, $1.20 \leq b \leq 2.00$, $0.01 \leq c \leq 0.06$, $0.01 \leq d \leq 0.60$, and $2.80 \leq e \leq 3.20$, $$Li_fV_gAl_hTi_iP_jO_{12} \quad (2),$$

where f, g, h, i, and j in the general formula (2) are numbers satisfying $0.5 \leq f \leq 3.0$, $0.01 \leq g < 1.00$, $0.09 < h \leq 0.30$, $1.40 < i < 2.00$, and $2.80 \leq j \leq 3.20$.

2. The all solid-state lithium ion secondary battery according to claim 1, wherein a, b, c, d, and e in the general formula (1) are numbers satisfying $0.8 \leq a \leq 3.0$, $1.20 < b \leq 2.00$, $0.01 \leq c < 0.06$, $0.01 \leq d < 0.60$, and $2.90 \leq e \leq 3.10$.

3. The all solid-state lithium ion secondary battery according to claim 1, wherein f, g, h, i, and j in the general formula (2) are numbers satisfying $0.8 \leq f \leq 3.0$, $0.01 \leq g < 1.00$, $0.09 < h \leq 0.30$, $1.40 < i \leq 2.00$, and $2.90 \leq j \leq 3.10$.

4. The all solid-state lithium ion secondary battery according to claim 1,
wherein the electrode layer having the active material layer containing the compound represented by the general formula (1) among the pair of electrode layers has an interlayer on a surface on a side of the solid electrolyte layer, and
the interlayer contains a compound represented by a general formula (3), $$Li_kV_mAl_nTi_qP_rO_{12} \quad (3),$$

where k, m, n, q, and r in the general formula (3) are numbers satisfying $0.5 \leq k \leq 3.0$, $1.00 \leq m \leq 1.20$, $0.06 \leq n \leq 0.09$, $0.60 \leq q \leq 1.40$, and $2.80 \leq r \leq 3.20$.

5. The all solid-state lithium ion secondary battery according to claim 1, wherein both electrode layers of the pair of electrode layers have the active material layer containing the compound represented by the general formula (1).

6. The all solid-state lithium ion secondary battery according to claim 1, wherein a relative density of the pair of electrode layers and the solid electrolyte layer provided between the pair of electrode layers is 80% or more.

7. The all solid-state lithium ion secondary battery according to claim 2, wherein f, g, h, i, and j in the general formula (2) are numbers satisfying $0.8 \leq f \leq 3.0$, $0.01 \leq g < 1.00$, $0.09 < h \leq 0.30$, $1.40 < i \leq 2.00$, and $2.90 \leq j \leq 3.10$.

8. The all solid-state lithium ion secondary battery according to claim 2, wherein both electrode layers of the pair of electrode layers have the active material layer containing the compound represented by the general formula (1).

9. The all solid-state lithium ion secondary battery according to claim 3, wherein both electrode layers of the pair of electrode layers have the active material layer containing the compound represented by the general formula (1).

10. The all solid-state lithium ion secondary battery according to claim 4, wherein both electrode layers of the pair of electrode layers have the active material layer containing the compound represented by the general formula (1).

11. The all solid-state lithium ion secondary battery according to claim 7, wherein both electrode layers of the pair of electrode layers have the active material layer containing the compound represented by the general formula (1).

12. The all solid-state lithium ion secondary battery according to claim 2, wherein a relative density of the pair of electrode layers and the solid electrolyte layer provided between the pair of electrode layers is 80% or more.

13. The all solid-state lithium ion secondary battery according to claim 3, wherein a relative density of the pair of electrode layers and the solid electrolyte layer provided between the pair of electrode layers is 80% or more.

14. The all solid-state lithium ion secondary battery according to claim 4, wherein a relative density of the pair of electrode layers and the solid electrolyte layer provided between the pair of electrode layers is 80% or more.

15. The all solid-state lithium ion secondary battery according to claim 5, wherein a relative density of the pair of electrode layers and the solid electrolyte layer provided between the pair of electrode layers is 80% or more.

\* \* \* \* \*